Inventor
ARCHIBALD J. GRIFFIN
By A. B. Bowman
Attorney

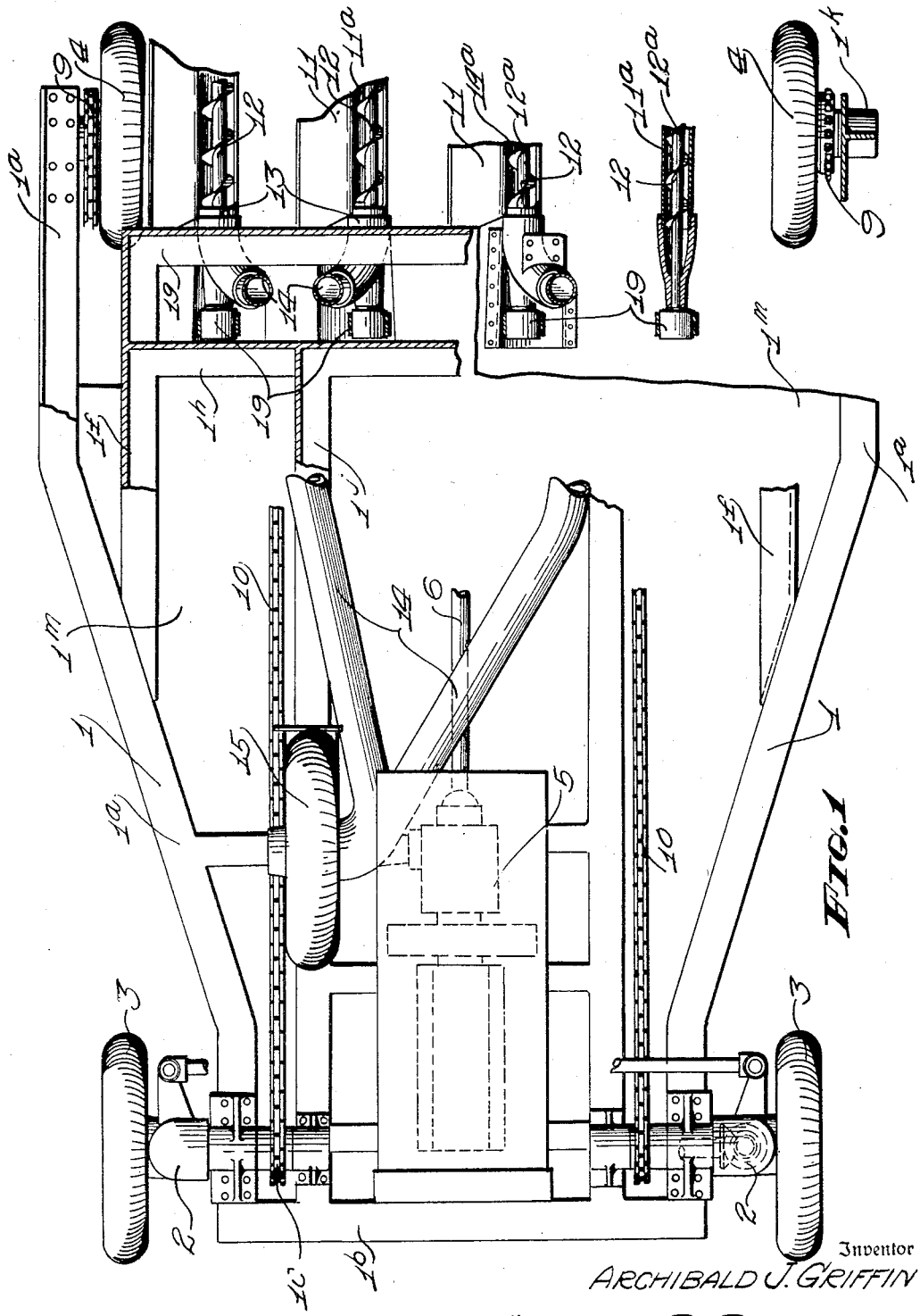

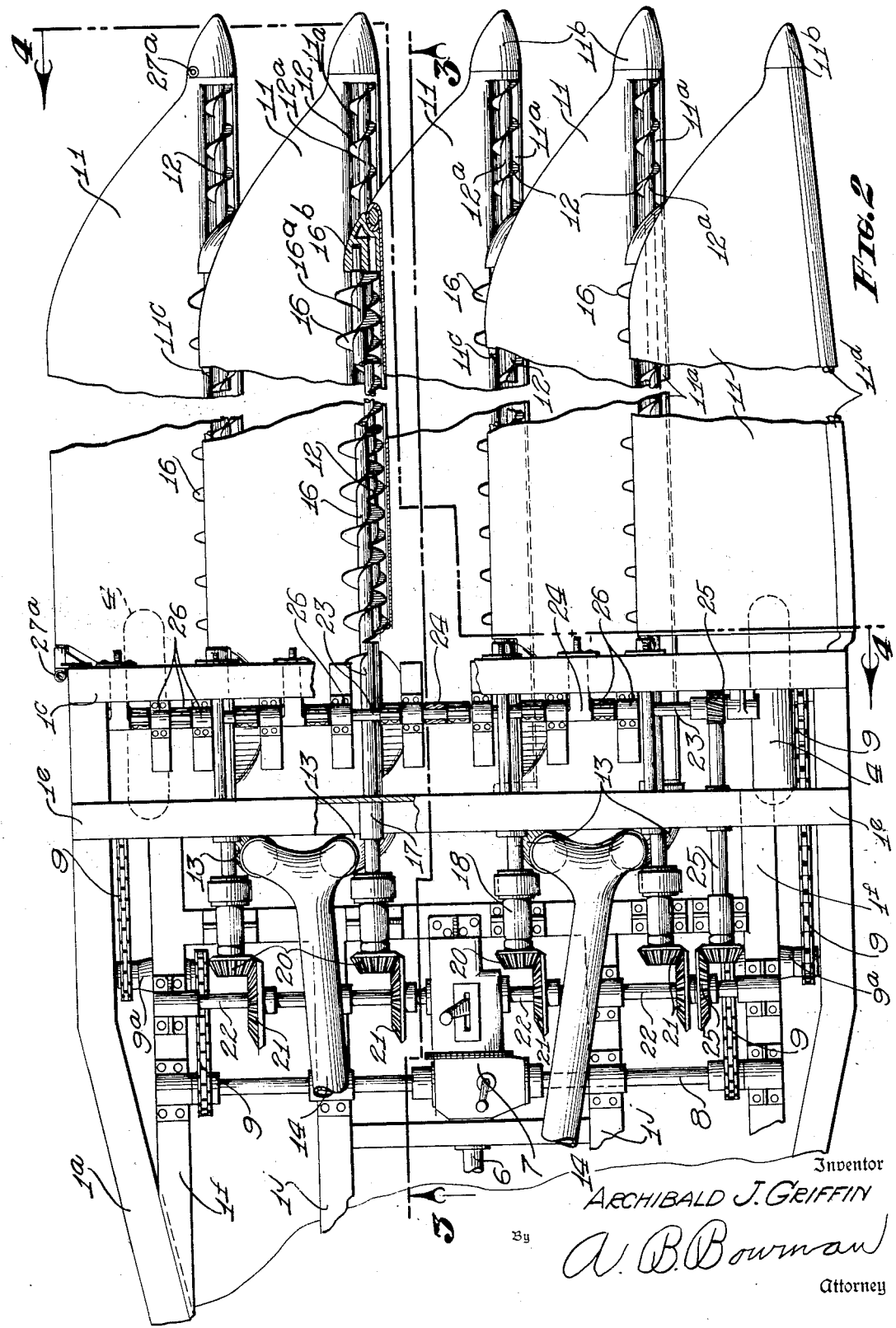

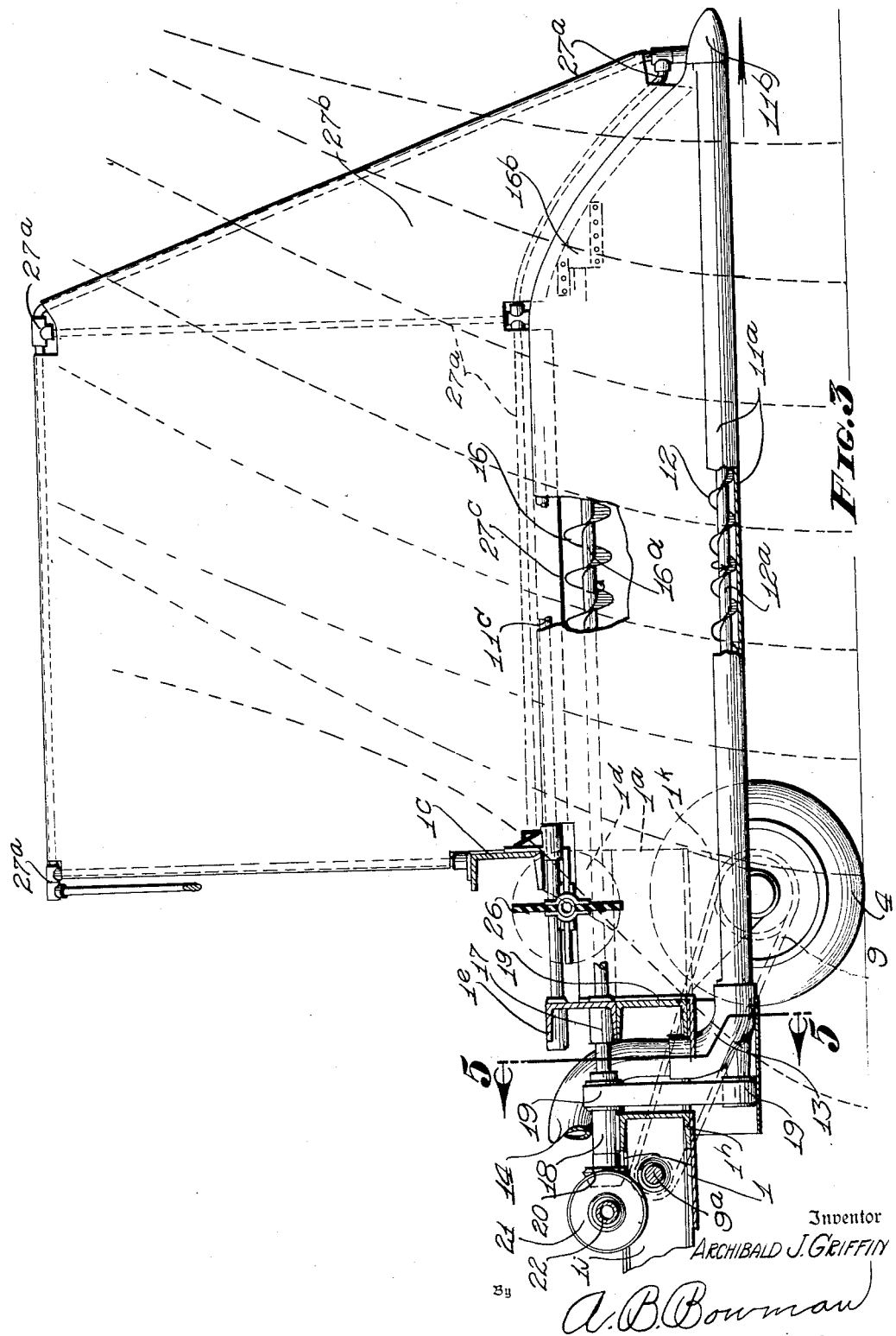

Patented July 11, 1933

1,917,583

UNITED STATES PATENT OFFICE

ARCHIBALD J. GRIFFIN, OF YUMA, ARIZONA

THRESHING MACHINE

Application filed November 27, 1931. Serial No. 577,434.

My invention relates to threshing machines, and the objects of my invention are:

First, to provide a threshing machine which is particularly adapted for the threshing of grasses, cereals or the like, in which the seeds are delicately attached to the stalk;

Second, to provide a machine of this class which operates effectively whether the grass or the like is relatively tall or relatively short;

Third, to provide a threshing machine which removes the seed of the grass but leaves the stalk standing;

Fourth, to provide a machine of this class which cranes or bends the grass laterally so that the seeds may drop into suitable troughs;

Fifth, to provide a machine of this class which not only threshes the seed but sacks it or otherwise stores the seed in suitable receptacles;

Sixth, to provide a threshing machine which incorporates a means of spacing the stalks of grass while the seed is being removed therefrom so that the seed may readily sift downwardly through the laterally inclined stalks and fall into suitable troughs;

Seventh, to provide a threshing machine in which the operating end is forward of the wheels or other means used to support the threshing machine so that the seeds are removed from the grass before the body of the machine passes thereover;

Eighth, to provide a threshing machine which may be mounted on floats so as to harvest the grains of various water grasses, and Ninth, to provide on the whole a novelly constructed threshing machine which is simple of operation and of maintenance, durable, efficient in its action and which will not readily deteriorate or get out of order.

Figure 5:
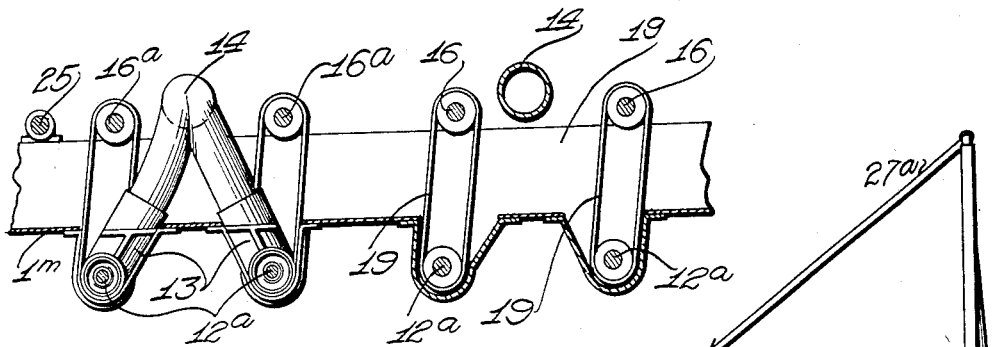
Figure 4:
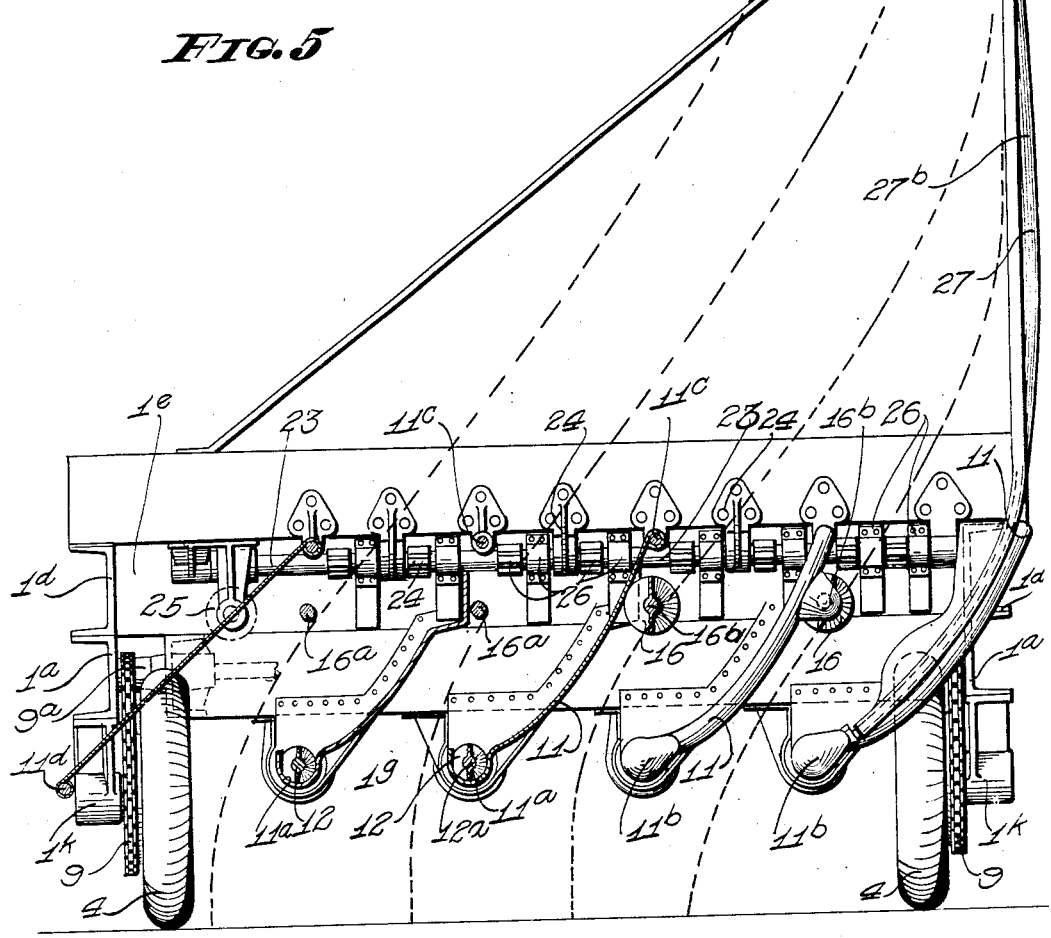

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a plan view of the rear portion of my machine with parts and portions shown diagrammatically and other parts and portions in section to facilitate the illustration; Fig. 2 is a plan view of the forward or threshing portion of my machine with parts and portions shown in section to facilitate the illustration; Fig. 3 is a fragmentary longitudinal sectional view substantially through 3—3 of Fig. 2 with parts and portions shown in elevation to facilitate the illustration; Fig. 4 is a transverse sectional view thereof through 4—4 of Fig. 2 with parts and portions shown in elevation to facilitate the illustration, and Fig. 5 is a fragmentary sectional view through 5—5 of Fig. 3 with parts and portions shown in elevation to facilitate the illustration.

Similar characters of reference refer to similar parts and portions throughout the several views of the drawings.

Frame 1, driving and steering means 2, driving and guide wheels 3, driving wheels 4, power plant 5, main drive shaft 6, control means 7, wheel driving shafts 8, sprocket and chain means 9 and 10, deflecting or craning booms 11, seed collecting conveyors 12, conduit end members 13, air conduits 14, blower 15, stalk spacing screws 16, bearings 17 and 18, belt and pulley means 19, bevel pinion gears 20, bevel drive gears 21, drive shaft 22, threshing shaft 23, bearings 24, gear and shaft means 25, threshing members 26, and side shield 27, constitute the principal parts and portions of my threshing machine.

A frame 1 is provided which includes a pair of main side members 1a, the central portions of which converge towards the rear end of the machine. At said rear end portion the side members 1a support combined driving and steering means 2, one extending outwardly from each side member 1a. The means 2 are adapted to support driving and guide wheels 3.

The side members 1a are connected together at their rear or closer ends by a cross member 1b. The forward extremities of the side members 1a are connected by a craning boom supporting girder 1c. The girder 1c is spaced upwardly from the side members 1a by means of pedestals 1d.

The main side members 1a are also connected at points a short distance rearwardly from the girder 1c by means of a cross girder 1e which rests directly upon the side members 1a.

Secured to the cross girder 1e a short distance inwardly from each main side member 1a and extending rearwardly is a secondary side member 1f which connects at its forward extremity to the main side member 1a. Depending from the cross girder 1e and extending between the secondary side members 1f is a secondary cross girder 1g. The secondary side members 1f are also connected by a cross member 1h located a short distance rearwardly of the secondary cross girder 1g. The cross member 1h and cross member 1b are connected together by beams 1j.

The rear extremities of the side members 1a are provided with brackets 1k which support driving wheels 4. The driving wheels 4 are offset inwardly with respect to the side members 1a but are in alinement with the rear or driving and steering means 2.

A suitable power plant 5 is supported from the beams 1j. The power plant operates a main drive shaft 6 which extends forwardly into a suitable control means 7 containing clutches, gear transmission means or the like in order to co-ordinate the operation of the various moving parts of the threshing machine. A pair of wheel driving shafts 8 extend laterally from the control means 7. At the extremities of the shafts 8 there are provided sprocket and chain means 9 which may include counter shafts 9a so as to connect with the driving wheels 4. The shafts 8 are also connected by suitable sprocket and chain means 10 with the driving and guide wheels 3.

The girders 1c, 1e and 1g are adapted to support the rear end portions of a plurality of deflecting or craning booms 11 which extend forwardly and horizontally from said girders. Each boom 11 is inclined laterally. The lower margin forms a trough 11a which terminates in an end piece 11b at the forward extremity of the boom. The end piece 11b forms a point. The opposite or upper margin of each boom 11 is provided with reinforcing 11c. This margin curves downwardly at its extremity and joins the end piece 11b. The upper margin of one boom overhangs the lower margin or trough portion 11a of the adjacent boom, as shown best in Figs. 2 and 4.

The troughs 11a are adapted to collect seed threshed from the grass or the like by the machine. Their operation will be brought out more fully hereinafter. For this reason, the boom having its lower margin at one side of the machine needs not be provided with a trough but may be provided instead with a reinforcing bar 11d which extends from the end piece 11b to the corresponding side of the threshing machine frame 1, as shown best in Figs. 2 and 4.

Each trough 11a is adapted to receive a seed collecting conveyor 12 which extends from the end piece 11b to the rear end of the boom. Each conveyor is in the form of a screw.

The rear end of each trough 11a fits into a conduit end member 13 which is in the form of a tubular elbow. The shaft, designated 12a, of the conveyor 12 extends through a bearing provided in the end member 13.

The several conduit end members 13 are connected to air conduits 14 which in turn connect with each other and with a blower 15 at the intake side thereof.

A spacing screw 16 is mounted along the under side of each boom, that is, each boom overhanging a trough 11a. Each spacing screw is disposed adjacent the upper margin of the corresponding boom and is provided with a shaft 16a, one end of which is supported in a suitable bearing or end member 16b provided in the extended portion of the boom. The other end of each shaft 16a extends through bearings 17 and 18 supported by the girder 1e and cross member 1h, respectively. Each spacing screw shaft 16a is connected through a belt and pulley means 19 to the shaft 12a of the corresponding collecting conveyor 12, as shown best in Figs. 3 and 5. The rearward extremity of the shaft 16a of each stalk spacing screw 16 is provided with a bevel pinion gear 20 which is adapted to mesh with a bevel drive gear 21. The several drive gears 21 are mounted on a common drive shaft 22 connected with the control means 7.

Mounted behind and below the craning boom supporting girder 1c is a threshing shaft 23 which is supported from said girder by means of bracket bearings 24. The threshing shaft 23 is driven by a gear and shaft means 25 connected with drive shaft 22. Mounted upon the shaft 23 between the several booms 11 is a plurality of radially extending threshing members 26. The threshing members are preferably formed of rubber or the like so as to be flexible. The extremities of these members project forwardly and downwardly of a line drawn from the under side of the girders 1c to the under side of the girders 1g.

The boom of which the high side thereof forms a margin of the threshing machine is provided with a side shield 27. The shield 27 includes a frame 27a which supports a shield member 27b preferably formed of canvas. The side shield 27 begins at the extremity of the boom and extends upwardly therefrom to a height above the grasses or the like in which the threshing machine is used. The side shield member 27b is provided with an apron 27c which overhangs the upper margin of the boom so that any seeds shaken off are guided by the side shield onto the boom.

The operation of my threshing machine is as follows: My threshing machine is particularly designed for a tall grass or plant commonly known as wild hemp which grows to a considerable height. The seeds of this plant are so loosely held thereby that the conventional threshing machine loses the larger percent of the seed. With my structure the several booms as they move forwardly into the wild hemp gently incline or crane the plants laterally so that their upper extremities or seed carrying portions overhang the several booms so that the seeds may drop thereupon and fall into the several troughs 11a. The position assumed by the plants is indicated schematically by means of the heavy dotted lines in Figs. 3 and 4. The plants tend to incline away or forwardly from the threshing machine, as shown in Fig. 3. The spacing screws 16 however engage the stalks so as to hold them in more or less a vertical position as well as separating them so that the seeds are free to fall upon the sloping portions of the various booms. As the threshing machine moves forwardly into the plants the stalks thereof engage the girders 1c and 1g so as to be engaged by the threshers 26. The threshers 26 shake loose whatever seed has not been already freed by the agitation produced by the forward movement of the threshing machine and action of the spacing screws 16. The threshing machine rides over the plants and for this reason is protected with a bottom plate 1k. The seeds which fall into the several troughs 11a are conveyed by the conveyors 12 to the conduit members 13 where they are drawn into the air conduits and from there into any suitable collecting means.

The speed of the spacing screws is preferably such that the stalks maintain a forward as well as a lateral inclination, this inclination increasing as they approach the girder 1c so that when the stalks are bent down and the machine is about to pass over them their tip ends are not unduly packed. The desired forward inclination of the stalks may be obtained by regulating the rearward feeding speed of the spacing screws so that it is somewhat less than the forward movement of the machine as a whole.

For grasses which are not as tall as wild hemp, the side shield 27 may be omitted or reduced in height.

For grasses or the like which grow in water, such as wild rice or domestic rice, floats or a barge structure may be substituted in place of the propelling mechanism shown.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a threshing machine, a plurality of spaced apart horizontally disposed craning booms, said booms inclined laterally whereby the upper margin of one overhangs the lower margin of the adjacent boom, deflecting portions formed at the extremities of said booms for bending or craning plants laterally with respect to said booms, and seed collecting means associated with said booms.

2. In a threshing machine, a plurality of spaced apart horizontally disposed craning booms, said booms inclined laterally whereby the upper margin of one overhangs the lower margin of the adjacent boom, and seed collecting means associated with the lower margins of said booms.

3. In a threshing machine, a propelling mechanism, a plurality of spaced apart horizontally extending craning booms projecting forwardly of said propelling mechanism, said booms being inclined laterally whereby the upper margin of one overhangs the lower margin of the adjacent boom, and seed collecting means associated with said booms.

4. In a threshing machine arranged to remove seeds while the plants remain planted, a propelling mechanism, a plurality of craning booms projecting forwardly of said propelling mechanism, arranged to crane or incline said plants laterally, means for agitating said plants, and means associated with said booms for collecting the seeds dropped from said plants.

5. In a threshing machine, a propelling mechanism, a plurality of spaced apart horizontally extending craning booms projecting forwardly of said propelling mechanism, said booms being inclined laterally whereby the upper margin of one overhangs the lower margin of the adjacent boom, means for agitating plants passing between said booms, and seed collecting means associated with said booms.

6. In a threshing machine, a plurality of spaced apart horizontally disposed craning booms, said booms inclined laterally whereby the upper margin of one overhangs the lower margin of the adjacent boom, seed collecting means associated with the lower margins of said booms, and agitating means arranged to act upon plants passing between said booms.

7. In a threshing machine arranged to remove seeds while the plants remain planted, a propelling mechanism, a plurality of craning booms projecting forwardly of said propelling mechanism, arranged to crane or incline said plants laterally, and plant spacing means associated with said booms.

8. In a threshing machine, a propelling mechanism, a plurality of plant craning members projecting forwardly therefrom including overlapping inclined seed catching plates, and seed collecting troughs at their lower margins.

9. In a threshing machine, a propelling mechanism, a plurality of plant craning members projecting forwardly therefrom including overlapping inclined seed catching plates, seed collecting troughs at their lower margins, and suction means connected with said troughs.

10. In a threshing machine, a propelling mechanism, a plurality of plant craning members projecting forwardly therefrom including overlapping inclined seed catching plates, seed collecting troughs at their lower margins, a seed conveyor disposed in each trough for conducting seed collected thereby to one end thereof, and suction means connected with the one end of each trough.

11. In a threshing machine, a propelling mechanism, a plurality of plant craning members projecting forwardly therefrom including overlapping inclined seed catching plates, seed collecting troughs at their lower margins, and plant spacing means disposed on the under sides of said craning members adjacent the upper margins thereof.

12. In a threshing machine, a propelling mechanism, a plurality of plant craning members projecting forwardly therefrom including overlapping inclined seed catching plates, and seed collecting troughs at their lower margins, a seed conveyor disposed in each trough for conducting seed collected thereby to one end thereof, suction means connected with the one end of each trough, and plant spacing means disposed on the under sides of said craning members adjacent the upper margins thereof.

13. In a threshing machine, a propelling structure, a plurality of laterally inclined forwardly projecting overlapping plate members their extremities beveled from their upper margins to their lower margins forming plant craning guides, troughs formed along the lower margins of said plate members, conveyors in said troughs arranged to carry seeds collected by said troughs to the one ends thereof, and suction means connected with said ends.

14. In a threshing machine, a propelling structure, a plurality of laterally inclined forwardly projecting overlapping plate members their extremities beveled from their upper margins to their lower margins forming plant craning guides, and seed collecting means associated with the lower margins of said plate members.

15. In a threshing machine, a propelling structure, a plurality of laterally inclined forwardly projecting overlapping plate members their extremities beveled from their upper margins to their lower margins forming plant craning guides, screw members disposed along the under sides of said plate members adjacent the upper margins thereof arranged to engage and space plants craned by said guides whereby seeds from said plants are free to fall upon said plate members, and means associated with the lower margins of said plate members for collecting said seeds.

16. In a threshing machine, a propelling structure, a plurality of laterally inclined forwardly projecting overlapping plate members their extremities beveled from their upper margins to their lower margins forming plant craning guides, troughs formed along the lower margins of said plate members, conveyors in said troughs arranged to carry seeds collected by said troughs to the one ends thereof, suction means connected with said ends, and means for agitating said plants while craned.

17. In a threshing machine, a propelling structure, a plurality of laterally inclined forwardly projecting overlapping plate members their extremities beveled from their upper margins to their lower margins forming plant craning guides, screw members disposed along the under sides of said plate members adjacent the upper margins thereof arranged to engage and space plants craned by said guides whereby seeds from said plants are free to fall upon said plate members, means associated with the lower margins of said plate members for collecting said seeds, and means for agitating said plants while craned.

In testimony whereof, I have hereunto set my hand at San Diego, California, this 5th day of November, 1931.

ARCHIBALD J. GRIFFIN.